March 4, 1930.                H. MEHLIG                1,749,731
CULTIVATOR
Filed April 9, 1928
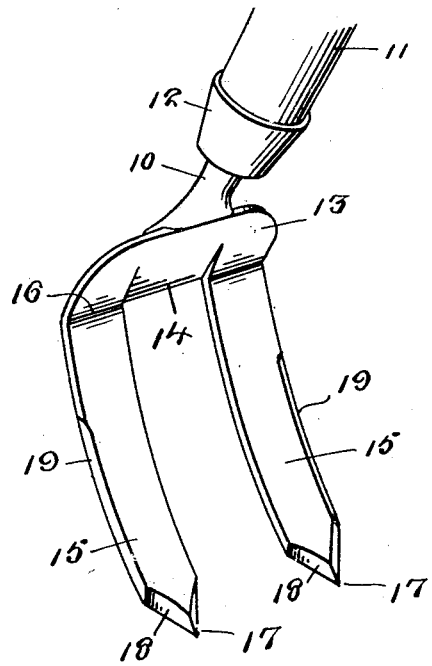
Fig. 1.
Fig. 2.
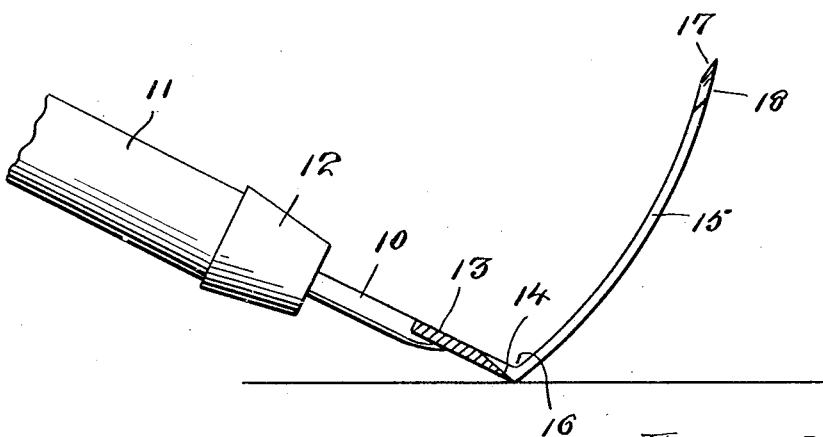
Henry Mehlig
INVENTOR
BY Victor J. Evans
ATTORNEY Patented Mar. 4, 1930

1,749,731

UNITED STATES PATENT OFFICE

HENRY MEHLIG, OF CORVALLIS, OREGON

CULTIVATOR

Application filed April 9, 1928. Serial No. 268,740.

This invention relates to cultivators embodying among other characteristics a multiplicity of tines, sharpened upon the ends and sides thereof to effect easy penetration of the earth.

Another object of the invention comprehends a portion of the cultivator interposed between the tines and sharpened to facilitate the entrance of the tines within the earth.

A further object of the invention is to dispose the tines at right-angles from the body of the cultivator and curved rectilinearly to contribute toward the easy penetration of the ground.

More specifically stated, the sharpened portions upon the side edges of the tines will permit cutting of brush and other débris precedent to cultivation of the sod.

With the above and other objects in view, the invention further consists of the following novel features and details of construction, to be hereinafter more fully described, illustrated in the accompanying drawing, and pointed out in the appended claims.

In the drawing:—

Figure 1 is a perspective view of my invention.

Figure 2 is a longitudinal sectional view taken through the invention.

Referring to the drawing in detail, wherein like characters of reference denote corresponding parts, the reference character 10 indicates a shank adapted for connection with one end of a handle member 11. A ferrule 12 carried by the shank 10 is adapted to prevent displacement of the shank from the particular end of the handle member.

A plate 13, transversely disposed upon the outermost end of the shank 10, is sharpened, as indicated at 14, upon the outermost side edge thereof, the purpose of which will be presently apparent.

Tines 15, offset as indicated at 16 from the ends of the plate 13 and extended at right-angles therefrom, terminate to provide V-shaped extremities 17 having sharpened sides 18. The outer side edges of the tines 15 are also sharpened, as indicated at 19, whereby the cultivator may be effectively employed for cutting away brush and other débris precedent to cultivation of the adhering sod.

As best illustrated in Figure 2 of the drawing, the tines are curved upon themselves whereby the same when manipulated after the manner of a hoe and swung from the penetrating position to occupy an opposite direction, the said tines, by reason of the particular curvature, will follow through the ground and undermine a clod of earth of appreciable proportions. Furthermore, the sharpened side edges 19 will also cut away fine roots etc., which generally cling to the sod. The sharpened outer edge 14 of the plate 13 will also co-act with the tines 15 in the particular scoop action aforementioned in that the sharpened edge 14 will cause less resistance to the particular course followed by the tines and which will also let the earth pass rather than pile it up upon the inner face of the plate 13. All of the dirt or earth will thus fall away from the cultivator in a more or less fine state whereas one or two blows against the remaining clod by the cultivator when exercised from the position shown in Figure 2 of the drawing will reduce the clod to smaller proportions.

The cultivator, as described and illustrated in the foregoing description and accompanying drawing, is believed an exceedingly useful one, in that the same may be utilized for several purposes and take the place of several tools. The greatest advantage in and to the invention is the particular disposition of the tines, the shape thereof, and the relationship of the plate member 13 with the tines while undermining sod inasmuch as none of the sod will cling to the tool whereby the usual necessity of shaking the tool to remove clinging or adhering earth is obviated.

The invention is susceptible of various changes in its form, proportions and minor details of construction, and the right is herein reserved to make such changes as properly fall within the scope of the appended claims.

Having described the invention, what is claimed is:

1. A cultivator comprising a plate member, tines carried by and offset therefrom and the outermost portions of the plate between the tines and the extremities of the tines being sharpened to effect penetration of the ground.

2. A cultivator including a handle comprising a plate member disposed in alignment with the handle and having a sharpened outer edge, tines carried upon the ends of the plate upon the opposite sides of the sharpened edge and projected at right angles therefrom, the tines being curved upon themselves, and the side edges and extremities of the tines being sharpened and pointed to effect penetration of the ground coincident with that of the sharpened edge of the plate member.

In testimony whereof I affix my signature.

HENRY MEHLIG.